United States Patent
Jeon et al.

(10) Patent No.: US 10,311,187 B2
(45) Date of Patent: Jun. 4, 2019

(54) CIRCUIT DESIGN METHOD AND SIMULATION METHOD BASED ON RANDOM TELEGRAPH SIGNAL NOISE

(71) Applicant: SAMSUNG ELECTRONICS CO., LTD., Suwon-si, Gyeonggi-do (KR)

(72) Inventors: Jong-Wook Jeon, Suwon-si (KR); Hyo-Eun Park, Hwaseong-si (KR); Keun-Ho Lee, Seongnam-si (KR); Ui-Hui Kwon, Hwaseong-si (KR); Jong-Chol Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 163 days.

(21) Appl. No.: 15/287,354

(22) Filed: Oct. 6, 2016

(65) Prior Publication Data
US 2017/0103155 A1  Apr. 13, 2017

(30) Foreign Application Priority Data
Oct. 13, 2015 (KR) .......................... 10-2015-0143047

(51) Int. Cl.
*G06F 17/50* (2006.01)
*H04L 12/24* (2006.01)

(52) U.S. Cl.
CPC ........ *G06F 17/5036* (2013.01); *G06F 17/505* (2013.01); *H04L 41/145* (2013.01)

(58) Field of Classification Search
CPC ............... G06F 17/5036; G06F 17/505; G06F 2217/82; G06F 17/5068; G06F 17/5072; G06F 17/5022; G06F 17/5077; G06F 2217/78

USPC .................................. 716/104, 108, 113–115
See application file for complete search history.

(56) References Cited

U.S. PATENT DOCUMENTS

| | | | |
|---|---|---|---|
| 7,939,859 B2 | 5/2011 | Tsuno | |
| 8,085,596 B2 | 12/2011 | Sarin et al. | |
| 8,155,905 B2 | 4/2012 | Miki | |
| 8,513,102 B2 | 8/2013 | Forbes et al. | |
| 8,615,034 B2 | 12/2013 | Kitagaki | |
| 8,707,234 B1* | 4/2014 | Ye ........................ | G06F 17/5036 716/106 |
| 8,850,277 B2 | 9/2014 | Amirkhanyan et al. | |
| 8,994,082 B2 | 3/2015 | Hung et al. | |
| 2003/0177427 A1* | 9/2003 | Fattouh ............... | G06F 17/5036 714/741 |
| 2007/0067747 A1* | 3/2007 | Checka ............... | G06F 17/5036 716/115 |

(Continued)

FOREIGN PATENT DOCUMENTS

| | | |
|---|---|---|
| JP | 08288348 | 11/1996 |
| KR | 1020110013987 | 2/2011 |
| KR | 1020140065244 | 5/2014 |

*Primary Examiner* — Nghia M Doan
(74) *Attorney, Agent, or Firm* — Volentine, Whitt & Francos, PLLC

(57) ABSTRACT

A simulation method includes receiving a netlist describing a plurality of devices, performing an arithmetic operation by using values of random telegraph signal (RTS) noise factors respectively corresponding to the plurality of devices, generating an RTS model corresponding to each of the devices, based on a result of the arithmetic operation, and generating a netlist in which the RTS model is reflected.

20 Claims, 22 Drawing Sheets

(56) References Cited

U.S. PATENT DOCUMENTS

| | | | |
|---|---|---|---|
| 2009/0192777 A1* | 7/2009 | Clement | G06F 17/5036 |
| | | | 703/16 |
| 2012/0065920 A1* | 3/2012 | Nagumo | G01R 31/2621 |
| | | | 702/117 |
| 2013/0320196 A1 | 12/2013 | Hirosige | |
| 2014/0312918 A1 | 10/2014 | Massetti et al. | |
| 2014/0321216 A1 | 10/2014 | Tanzawa | |
| 2014/0327059 A1 | 11/2014 | Ammo | |
| 2016/0366656 A1* | 12/2016 | Melanson | H04W 52/32 |

\* cited by examiner

FIG. 9

| | RTS NOISE INFORMATION | | | |
|---|---|---|---|---|
| Device (Type 1) | TRAP ELECTRON NUMBER Mean 1, σ1 | TRAP TIME CONSTANT Mean 1, σ1 | ΔId Mean 1, σ1 | ELECTRON TRAP POSITION Mean 1, σ1 |
| Device (Type 2) | TRAP ELECTRON NUMBER Mean 2, σ2 | TRAP TIME CONSTANT Mean 2, σ2 | ΔId Mean 2, σ2 | ELECTRON TRAP POSITION Mean 2, σ2 |
| ... | ... | ... | ... | ... |
| Device (Type M) | TRAP ELECTRON NUMBER Mean M, σM | TRAP TIME CONSTANT Mean M, σM | ΔId Mean M, σM | ELECTRON TRAP POSITION Mean M, σM |

CIRCUIT DESIGN METHOD AND SIMULATION METHOD BASED ON RANDOM TELEGRAPH SIGNAL NOISE

CROSS-REFERENCE TO RELATED APPLICATION

This application claims the benefit of Korean Patent Application No. 10-2015-0143047, filed on Oct. 13, 2015, in the Korean Intellectual Property Office, the disclosure of which is incorporated herein in its entirety by reference.

BACKGROUND

The disclosure relates to a circuit design method and a simulation method, and more particularly, to a circuit design method and a simulation method, which accurately reflect the actual characteristic of a circuit.

A tool for designing and simulating an integrated circuit (IC) is generally used. Generally, an integrated circuit (IC) is implemented by arranging a plurality of circuits with a circuit schematic tool (hereinafter referred to as a schematic tool), and an operation of an IC implemented with a schematic tool may be verified by using a simulation tool. An example of the simulation tool includes a program referred to as simulation program with integrated circuit emphasis (SPICE).

The schematic tool provides a netlist corresponding to a designed IC. A connection relationship of circuit elements connected to each other in the IC may be explained by using the netlist. Also, the schematic tool may provide, as a simulation tool, a model library including various device models having the characteristic of a circuit element (for example, a device) included in the designed IC.

Devices such as field effect transistors (FETs) and/or the like included in an IC may generate noise (hereinafter referred to as RTS noise) caused by a random telegraph signal (RTS). A plurality of FETs included in an IC may randomly generate RTS noise, but it is difficult for a general circuit simulation to consider RTS noises which are randomly generated by the FETs. For this reason, in simulating a designed circuit, it is difficult to reflect the actual characteristics of devices such as FETs.

SUMMARY

The disclosure provides a circuit design method and a simulation method, which more accurately reflect an actual characteristic of a circuit.

According to an aspect of the disclosure, there is provided a simulation method that includes receiving a netlist describing a plurality of devices, performing an arithmetic operation by using values of random telegraph signal (RTS) noise factors respectively corresponding to the plurality of devices, generating an RTS model corresponding to each of the devices, based on a result of the arithmetic operation, and generating a netlist in which the RTS model is reflected.

According to another aspect of the disclosure, there is provided a circuit design method that includes receiving a netlist and a model library in which random telegraph signal (RTS) noise is not reflected, determining RTS noise information corresponding to each of a plurality of devices described in the netlist, generating an RTS model corresponding to each of the devices, based on a result of the determination of the RTS noise information, and outputting a netlist and a model library in which the RTS noise is reflected, based on the generated RTS model.

According to another aspect of the disclosure, there is provided a simulation method that includes receiving a netlist describing a plurality of devices, performing, by using the netlist, a first simulation in which random telegraph signal (RTS) noise is not reflected, generating RTS noise information corresponding to each of the devices, based on a result of the first simulation, generating an RTS model corresponding to each of the devices, based on the RTS noise information, and performing, by using a modified netlist, a second simulation in which RTS noise is reflected, based on a result of the generation of the RTS model.

According to another aspect of the disclosure, there is provided a schematic tool that includes a receiver configured to receive a netlist, in which random telegraph signal (RTS) noise is not reflected, and RTS noise information; a calculator configured to perform an arithmetic operation on RTS noise information corresponding to each of a plurality of devices included in the netlist to generate an RTS model corresponding to each of the devices, and a generator configured to generate a netlist in which the RTS model is reflected.

BRIEF DESCRIPTION OF THE DRAWINGS

Embodiments of the disclosure will be more clearly understood from the following detailed description taken in conjunction with the accompanying drawings in which:

FIG. 9 is a diagram illustrating an example of RTS noise information applied to embodiments;

DETAILED DESCRIPTION OF THE EMBODIMENTS

Figure 1:
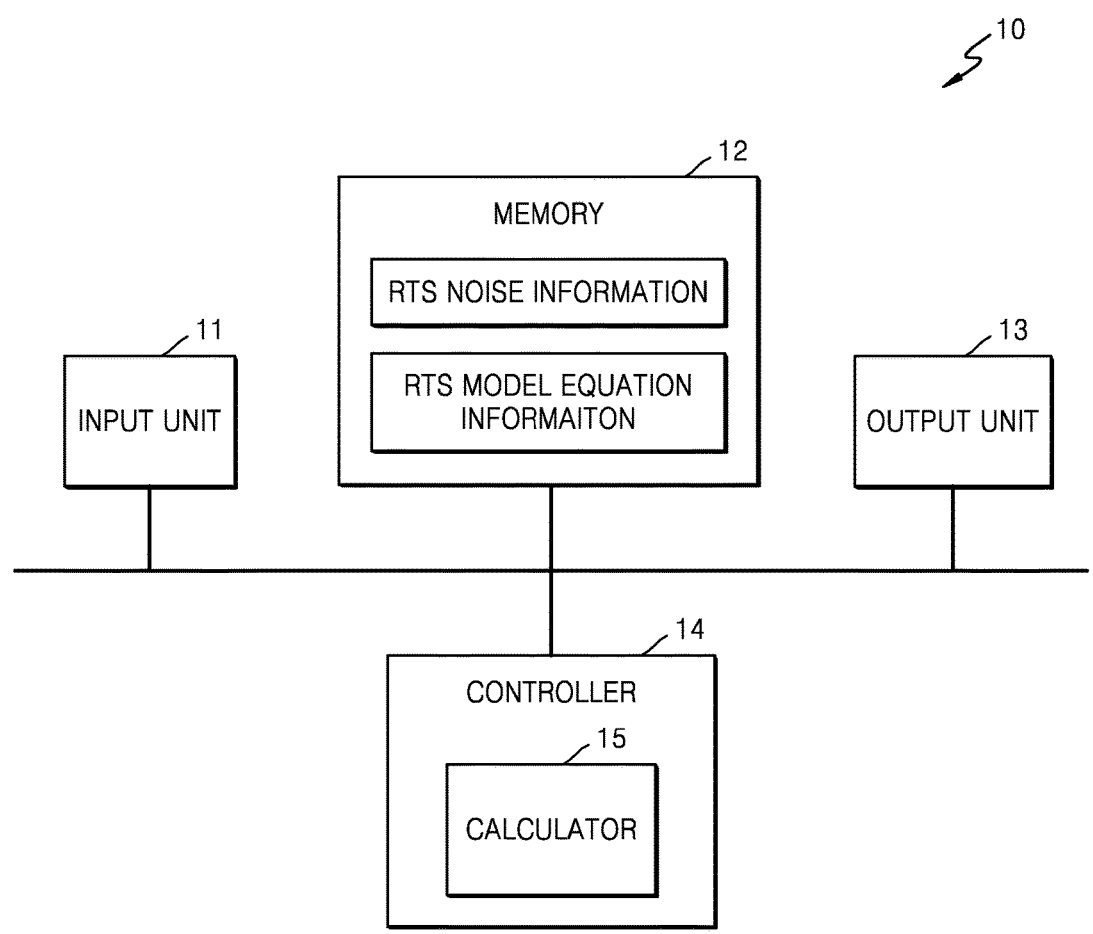
FIG. 1 is a block diagram illustrating an implementation example of a simulation device according to embodiments.

Hereinafter, example embodiments of the disclosure will be described in detail with reference to the accompanying drawings. Embodiments of the disclosure are provided so that this disclosure will be thorough and complete, and will fully convey the concept of the disclosure to one of ordinary skill in the art. Since the disclosure may have diverse modified embodiments, preferred embodiments are illustrated in the drawings and are described in the detailed description of the disclosure. However, this does not limit the disclosure within specific embodiments and it should be understood that the disclosure covers all the modifications, equivalents, and replacements within the idea and technical scope of the disclosure. Like reference numerals refer to like elements throughout. In the drawings, the dimensions and size of each structure are exaggerated, reduced, or schematically illustrated for convenience in description and clarity.

FIG. 1 is a block diagram illustrating an implementation example of a simulation device 10 according to embodiments. According to an embodiment, the simulation device 10 of FIG. 1 may be defined as a system for performing various functions. For example, the simulation device 10 may be a device that arranges and connects a plurality of circuit elements by using a model library including a plurality of device models and provides a netlist corresponding to the arrangement and connection. Alternatively, the simulation device 10 may be a device that generates a netlist corresponding to the arrangement and connection of circuit elements and simulates a circuit by using the generated netlist and a model library. Also, the simulation device 10 may be a device that receives a netlist and a model library and performs an arithmetic operation to provide the netlist and model library whose characteristics have been changed. In addition, the simulation device 10 may be defined in various forms.

The netlist may indicate a connection relationship between circuit elements included in a designed circuit, a connection relationship between function blocks configured with circuit elements, and node information based on a connection of circuit elements. A structure of a circuit may be obtained through the netlist. Hereinafter, in describing embodiments, a circuit (or a designed circuit) may denote an IC, and a device included in a circuit may be defined as a circuit element included in an IC.

The simulation device 10 may include an input unit 11, a memory 12, an output unit 13, and a controller 14. Also, the controller 14 may include a calculator 15. The input unit 11, the memory 12, the output unit 13, and the controller 14 may be connected to each other through a bus. The controller 14 may control the input unit 11, the memory 12, and the output unit 13.

The input unit 11 may be configured with, for example, a keyboard, a manipulation panel, or various data read devices. The memory 12 may be configured with various semiconductor memories, a hard disk, and/or the like. The output unit 13 may be configured with a monitor, a printer, a recording device, and/or the like. The controller 14 may perform various processing operations associated with a simulation. For example, according to an embodiment, the controller 14 may generate a netlist and a model library in which RTS noise is reflected, or may perform a control operation that allows a simulation, in which RTS noise is reflected, to be performed.

The calculator 15 may perform an arithmetic operation based on various pieces of information stored in the memory 12, in connection with each of devices included in a netlist in which RTS noise is not reflected. For example, the calculator 15 may perform an arithmetic operation by using values of factors of RTS noise of each device. The factors of the RTS noise of each device may indicate components representing the RTS noise (or a current based on the RTS noise). For example, referring to a transistor such as a metal oxide semiconductor field effect transistor (MOSFET) as an example of a device, RTS noise which occurs in a MOSFET may have a certain signal waveform, and factors for representing the RTS noise may include the number of electrons trapped by a dielectric, a trap time constant indicating a time for which the electrons are trapped by the dielectric, a difference value "$\Delta$ Id" of a current flowing through a transistor, and/or the like.

Considering the characteristic of RTS noise, RTS noises may randomly occur for a plurality of transistors included in a designed circuit. That is, an electron trap characteristic appears in a random pattern for a plurality of transistors, and thus, values of RTS noise factors which are calculated for the transistors may have random characteristics.

The calculator 15 may perform an arithmetic operation by using values of factors of the RTS noise. As a result of the arithmetic operation, an RTS model corresponding to the RTS noise may be generated. For example, the RTS model may correspond to a voltage source or a current source having a certain power level. The controller 14 may generate a netlist in which the RTS noise is reflected for each of devices (for example, transistors), based on the generated RTS model. An RTS model corresponding to each of the devices may be reflected as an instance parameter in the generated netlist.

In an embodiment, a plurality of device models having different parameters in association with RTS noise may be generated for each of multiple devices, based on the arithmetic operation result. For example, each of the device models may include various kinds of parameters indicating the operation characteristic of a device, and parameters associated with the RTS noise may have different values for each device.

For example, a first device model corresponding to a first transistor and a second device model corresponding to a second transistor may be generated from a device model which corresponds to a plurality of transistors in common, and the first device model and the second device model may have parameters having different values in association with RTS noise. The parameters having the different values may correspond to various pieces of information associated with the RTS noise. For example, a plurality of device models into which a parameter associated with a voltage source or a current source based on an RTS model is newly added may be generated, or a plurality of device models into which parameters associated with values of various RTS noise factors for representing the RTS noise are newly added may be generated.

Moreover, when a model library including a plurality of device models is newly generated through the above-described method, a state of a netlist having a before-change hierarchical structure may be changed to a flattened state. For example, a plurality of devices may share a device model according to a hierarchical structure and, thus, a before-change netlist may have a characteristic where deviation information is shared by the plurality of devices. On the other hand, when a model library is newly generated according to an embodiment, states of devices of a netlist may be changed to a flattened state instead of a hierarchy and, thus, different device models may be applied to the devices, whereby different RTS models may be applied to the devices.

The memory 12 may store RTS noise information as various pieces of information applied to an arithmetic operation according to an embodiment. The RTS noise information may include the values of the factors of the RTS noise, and the values of the factors of the RTS noise may be calculated (or predicted) according to various methods. For example, the RTS noise may be relevant to a structure (for example, a width and a length of a channel of a transistor) of each of multiple transistors, and values of RTS noise factors corresponding to the structure of each transistor may be calculated. Alternatively, an RTS noise signal which occurs in a transistor having a certain structure may be measured based on an operation of the transistor, and values of RTS noise factors may be calculated based on a result of the measurement.

Moreover, an RTS model may be generated by performing an arithmetic operation on the RTS noise factors, and equation information for the arithmetic operation may be stored in the memory 12. Also, a result of a simulation which is performed by using a netlist and a model library which are generated according to embodiments may be stored in the memory 12. In addition, the memory 12 may store a control program which is used for the controller 14 to control the input unit 11, the memory 12, and the output unit 13.

Moreover, RTS noises may randomly occur in each of multiple devices, and a signal waveform of RTS noise may be detected through a simulation result based on a structure (for example, a width and a length of a channel) of each of the devices or a measurement operation of a circuit implementing each device. RTS noises may randomly occur in each of devices. Therefore, values of RTS noise factors calculated based on each device may have a certain variation, and a mean and a deviation (for example, sigma "σ") of the RTS noise factors may be calculated based on each device.

A mean and a deviation of the RTS model may be defined based on a mean/deviation of values of RTS noise factors. For example, when an RTS model is a current source, a current level of the current source may be defined as having a certain mean and deviation. That is, an RTS model which is generated for each of the devices may have a deviation corresponding to RTS noise which randomly occurs in each device. A simulation may be performed by reflecting an RTS model which is generated as described above according to an embodiment, and thus, a simulation result based on RTS noise which randomly occurs in each device may be obtained.

The RTS noise characteristics of devices may differ depending on an operating environment (for example, a bias condition and/or the like) of each of the devices. For example, RTS noise randomly occurs in each of the devices, but some devices may be set as having the same RTS noise characteristic depending on an operating environment of each device.

A detailed operation according to embodiments illustrated in FIG. 1 will be described with reference to FIGS. 2A, 2B, 3 and 4. FIGS. 2A, 2B, 3 and 4 are block diagrams illustrating an example where functions according to embodiments are added into a circuit schematic tool or a simulation tool in various forms. Hereinafter, in describing embodiments, it is assumed that devices where RTS noise randomly occurs are transistors.

Figure 2A:
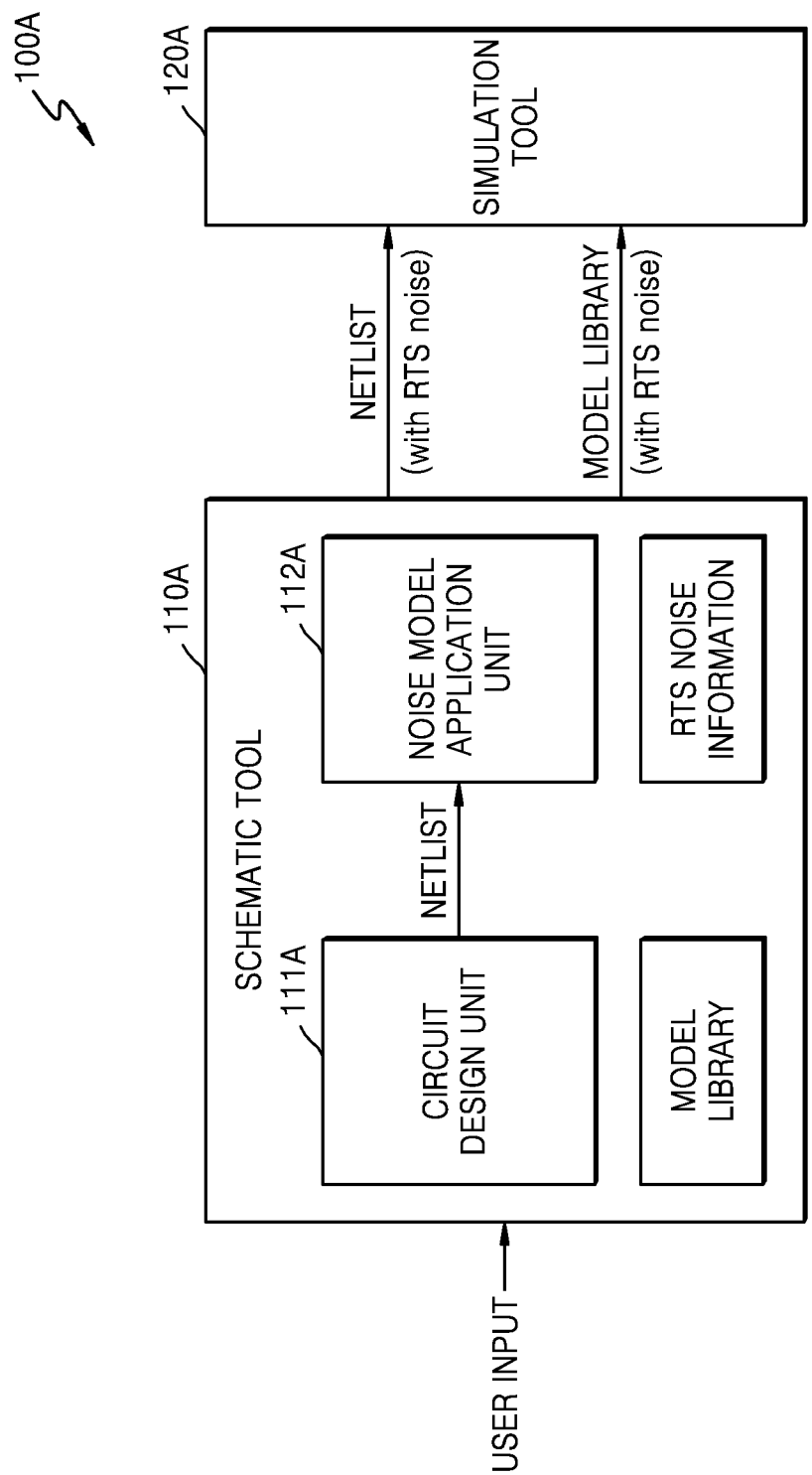
FIGS. 2A, 2B, 3 and 4 are block diagrams illustrating an example where functions according to embodiments are added into a circuit schematic tool or a simulation tool in various forms.

Referring to FIG. 2A, a simulation system 100A may include a schematic tool 110A and a simulation tool 120A according to embodiments. The schematic tool 110A and the simulation tool 120A may each be implemented with a program executable by a computer. The schematic tool 110A may be variously defined depending on a function thereof. For example, the schematic tool 110A may be a tool that designs a circuit according to a user input and supplies, to the simulation tool 120A, a netlist and a model library based on a result of the circuit design. Alternatively, the schematic tool 110A according to embodiments may be a tool that receives a normal netlist (for example, a netlist in which RTS noise is not reflected) and a normal model library and outputs a netlist and a model library for performing a simulation in which the RTS noise is reflected.

The netlist and the model library supplied to the simulation tool 120A may respectively be a netlist and a model library in which RTS noise is reflected according to embodiments. For example, the netlist supplied to the simulation tool 120A may be a netlist (a netlist with RTS noise) in which different RTS models by devices are reflected, and the model library supplied to the simulation tool 120A may be a model library (a model library with RTS noise) including a plurality of device models which have parameters having different values in association with RTS noise.

The schematic tool 110A may include a circuit design unit 111A and a noise model application unit 112A. The noise model may be an RTS model which is generated by modelling RTS noise of each of the devices. Also, the RTS model may be a current source or a voltage source which is connected to at least one node of a transistor. The circuit design unit 111A may generate a netlist indicating a circuit design (for example, arrangement of devices and a connection state between the devices) based on a user input and may supply the netlist to the noise model application unit 112A. The user input may include information for a selection and a connection of devices.

The RTS noise information may be supplied to the noise model application unit 112A. The RTS noise information may include values of RTS noise factors. The values of the RTS noise factors may be previously generated based on a simulation result obtained by simulating a transistor having a certain structure and may be stored in the schematic tool 110A. Alternatively, the values of the RTS noise factors may be previously generated based on a result obtained by measuring a signal waveform of a circuit including a transistor and may be stored in the schematic tool 110A. Alternatively, a netlist and a model library in which RTS noise is not reflected may be supplied to and simulated by the simulation tool 120A, and RTS noise information generated based on a result of the simulation may be supplied to the noise model application unit 112A.

The noise model application unit 112A may generate an RTS model corresponding to each of a plurality of transistors included in the netlist from the circuit design unit 111A. For example, the noise model application unit 112A may check transistors of a circuit with reference to the netlist from the circuit design unit 111A and may generate an RTS model corresponding to each of the transistors, based on an arithmetic operation using the transistors and RTS noise information corresponding to each of the transistors. For example, first and second transistors included in the netlist may respectively correspond to RTS noise factors having different values and, thus, different RTS models corresponding to the first and second transistors may be generated. For example, a current waveform of a current source corresponding to the RTS model of the first transistor may differ from a current waveform of a current source corresponding to the RTS model of the second transistor. For example, a current level mean and deviation of the current source corresponding to the RTS model of the first transistor may differ from a current level mean and deviation of the current source corresponding to the RTS model of the second transistor.

According to the above-described embodiment, a netlist and a model library may be changed depending on an RTS model which is generated for each of the transistors. A netlist generated through the change may be supplied to the simulation tool 120A, and a model library generated though the change may be stored in the schematic tool 110A and may be supplied to the simulation tool 120A.

The simulation tool 120A may perform a simulation by using the netlist and the model library from the schematic tool 110A. For example, SPICE may be used as the simulation tool 120A for predicting circuit characteristic. For example, when a designed circuit does not accurately operate according to a designer's intention, the circuit may be corrected and again simulated, and thus, whether an operation of an IC is suitable may be checked before the IC is manufactured.

Figure 2B:
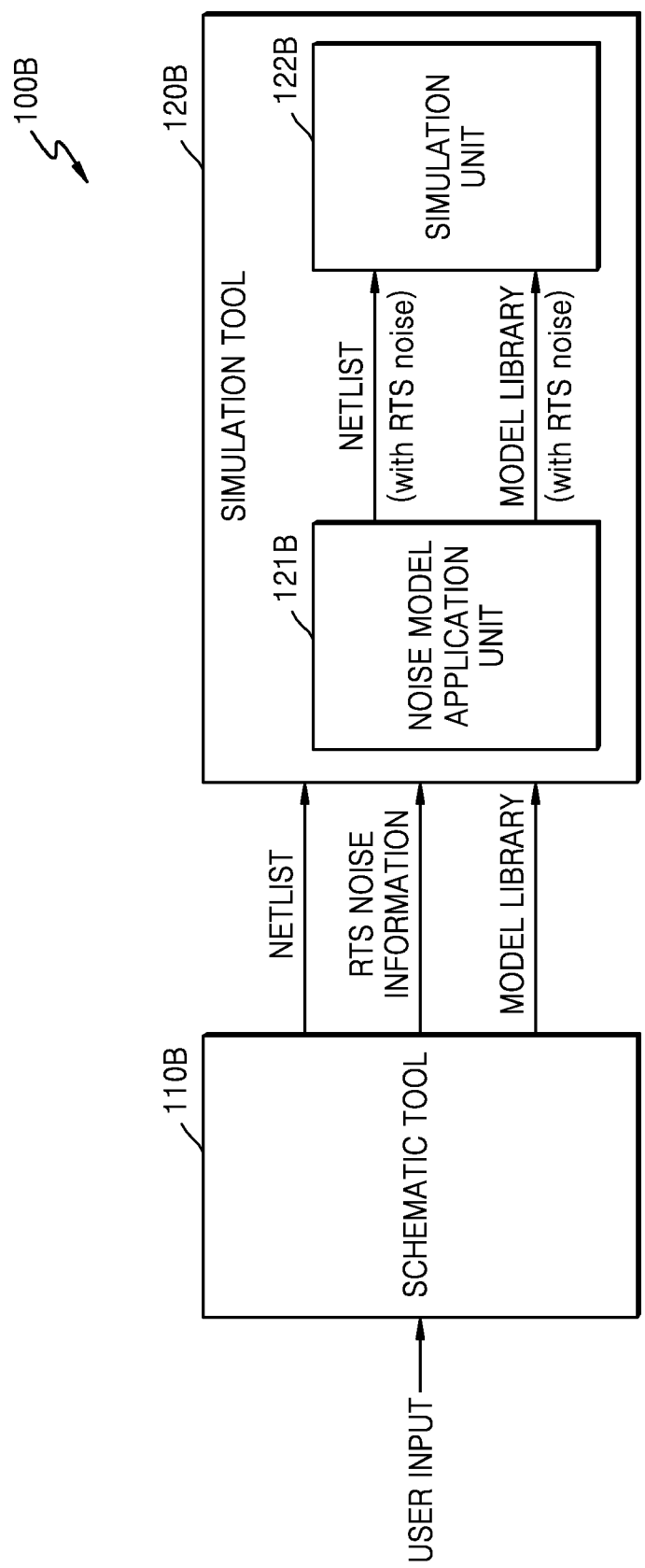

Referring to FIG. 2B, a simulation system 100B may include a schematic tool 110B and a simulation tool 120B according to embodiments. The simulation tool 120B may include a simulation unit 122B that performs a simulation by using a netlist and a model library, and according to the above-described embodiment, may further include a noise model application unit 121B for applying an RTS model to each of transistors. A detailed operation of the simulation system 100B of FIG. 2B is the same as or similar to the operation described above with reference to FIG. 2A, and thus, its detailed description is not repeated.

The noise model application unit 121B may receive a netlist and a model library, in which RTS noise is not reflected, from the schematic tool 110B. Also, the noise model application unit 121B may receive RTS noise information corresponding to a designed circuit, and for example, the RTS noise information may be supplied from the schematic tool 110B to the simulation tool 120B. The noise model application unit 121B may change the netlist and/or the model library by using the received information and may supply a modified netlist and/or a changed model library, generated through the change, to the simulation unit 122B. The modified netlist may be a netlist in which an RTS model is reflected. Alternatively, new device models may be generated by reflecting an RTS model, and in the modified netlist, devices may respectively correspond to device models having different RTS models.

Figure 3:
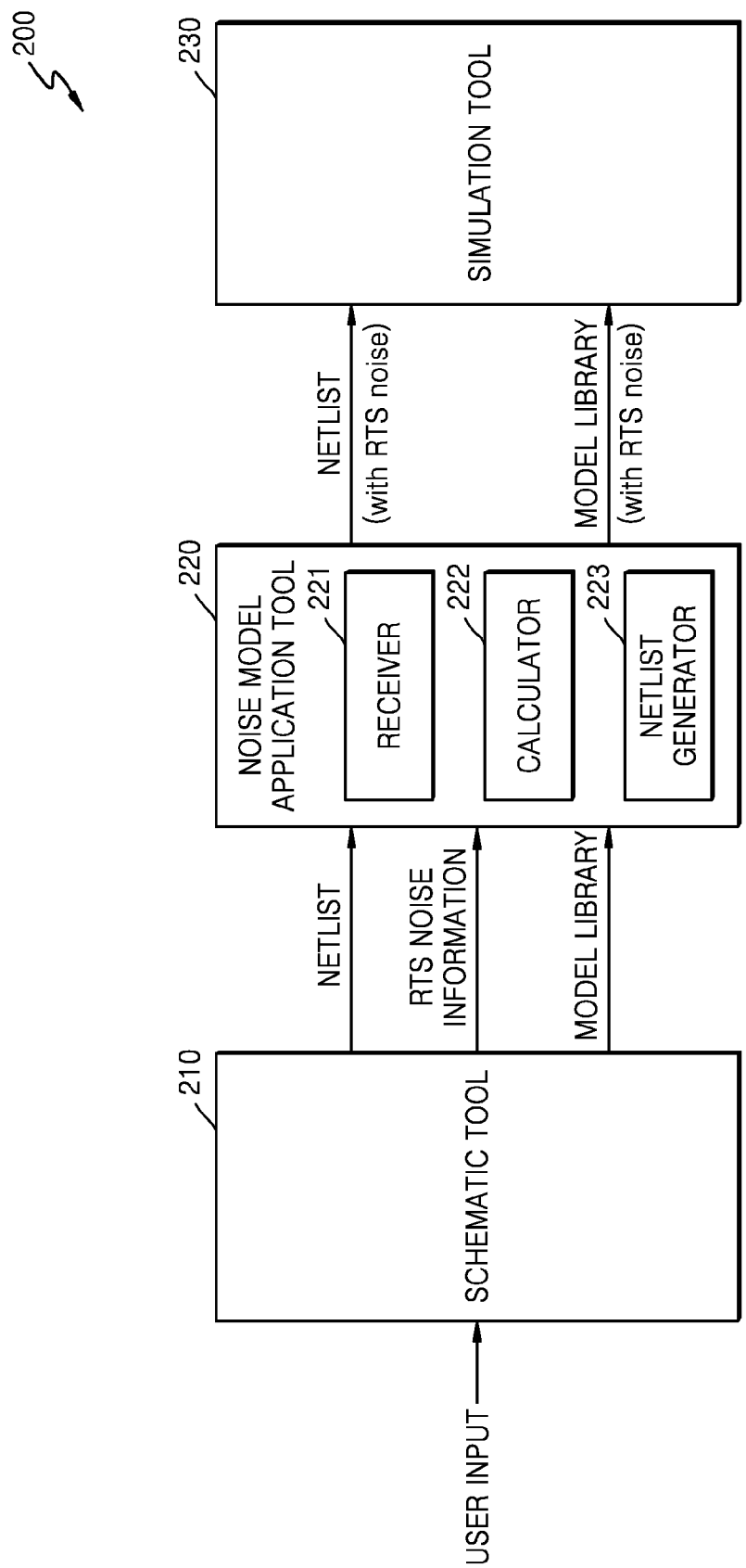

Referring to FIG. 3, the simulation system 200 may include a schematic tool 210, a noise model application tool 220, and a simulation tool 230 according to embodiments. The schematic tool 210, the noise model application tool 220, and the simulation tool 230 may each be implemented with a program executable by a computer. The noise model application tool 220 according to an embodiment may provide a netlist applied to a simulation and thus may be referred to as a schematic tool. In describing an example of a detailed operation of the simulation system 200, a detailed description of an operation which is the same as or similar to the above-described embodiment is not provided.

The schematic tool 210 may output a netlist indicating a circuit which is designed based on a user input, and may also output a model library including parameters respectively corresponding to devices included in the netlist. The netlist and the model library output from the schematic tool 210 may each have information in which RTS noise of each of the devices is not reflected. Also, RTS noise information may be pre-stored in the noise model application tool 220, or may be supplied from the schematic tool 210 to the noise model application tool 220.

The noise model application unit 220 may include a receiver 221, which receives a netlist, a model library, and RTS noise information, and a calculator 222 that generates an RTS model for each of multiple devices according to the above-described embodiment. Also, the noise model application tool 220 may further include a netlist generator 223 that generates a netlist in which an RTS model is reflected, based on a result of an arithmetic operation which is performed for generating the RTS model.

The noise model application tool 220 may output a netlist and a model library, in which RTS noise is reflected, by performing an arithmetic operation based on the RTS noise information. For example, the noise model application tool 220 may generate an RTS model corresponding to each of the devices by using values of RTS noise factors (for example, the number of trap electrons, a current value difference, a time constant, and/or the like) corresponding to each device and may reflect the generated RTS model in the netlist and the model library. Also, the netlist and the model library in which the RTS model is reflected may be supplied to the simulation tool 230.

Figure 4:
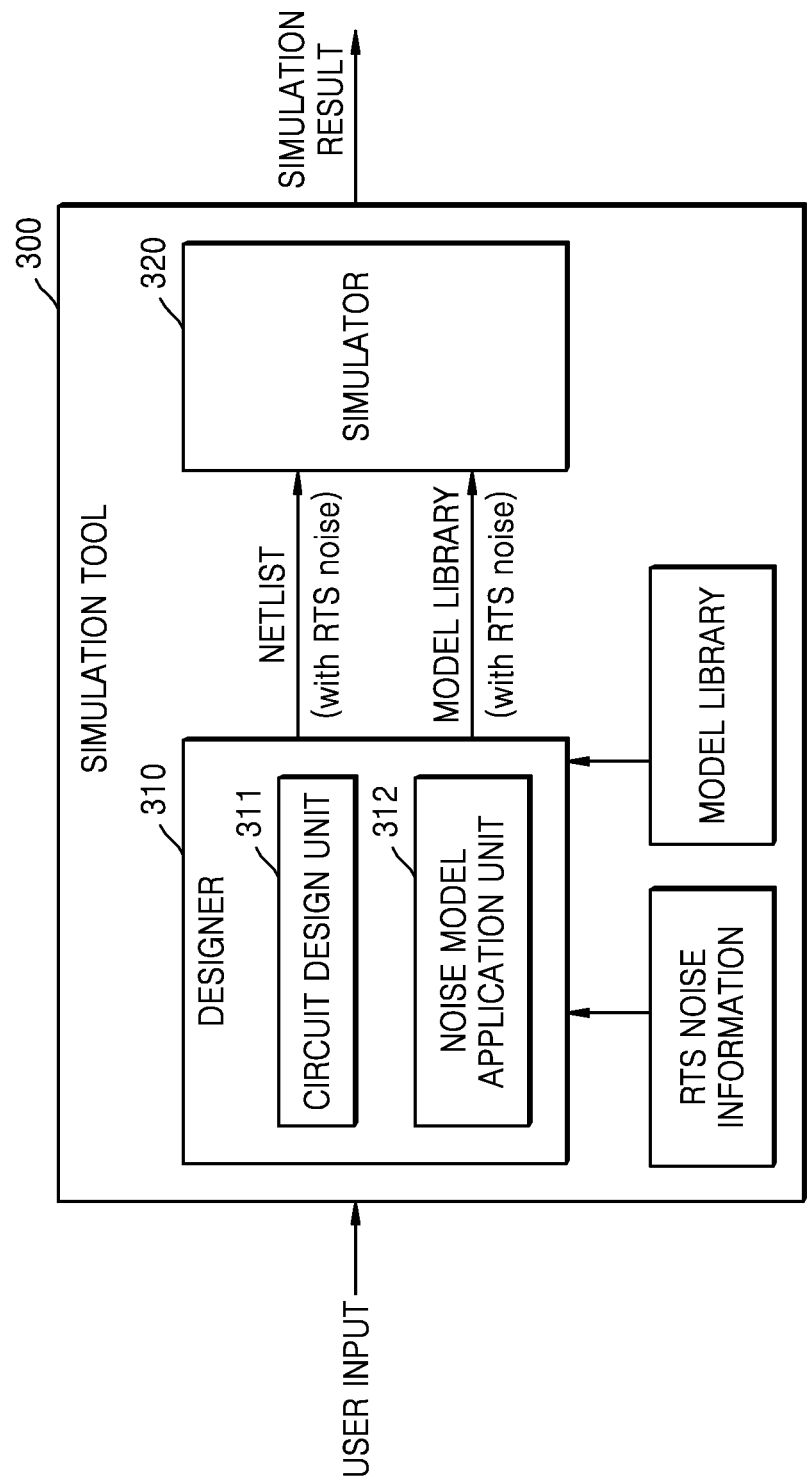

Referring to FIG. 4, a simulation system may be implemented with a simulation tool 300. That is, a circuit design function, a noise model application function, and a simulation function according to the above-described embodiment may be performed by the simulation tool 300. In describing a detailed operation example of the simulation tool 300, a detailed description of an operation which is the same as or similar to the above-described embodiment is not repeated.

The simulation tool 300 may include a designer 310 and a simulator 320. Also, the designer 310 may include a circuit design unit 311 and a noise model application unit 312 which operate identically or similarly to the above-described embodiment. The circuit design unit 311 may provide a circuit which is designed according to a user input, and the noise model application unit 312 may generate a netlist and a model library in which an RTS model is reflected, based on an arithmetic operation which is performed by using RTS noise information. The simulator 320 may perform a simulation operation by using the netlist and the model library, in which the RTS model is reflected, to generate an analysis result of a designed circuit.

According to the above-described embodiments, provided is a design solution based on RTS noise which randomly occurs in each of devices. That is, a change in an operation caused by RTS noise may be predicted for each device, and a circuit design for representing the predicted operation change may be made. Accordingly, a robust circuit may be developed in terms of noise.

Figure 5:
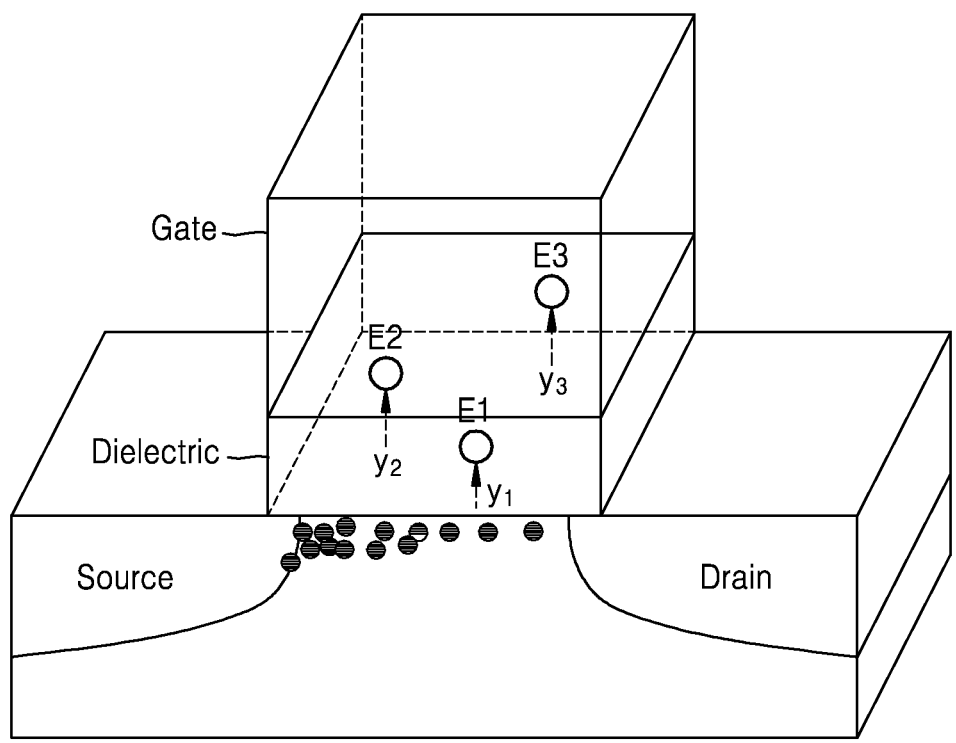
FIG. 5 is a conceptual diagram of an electron trap causing RTS noise to a transistor.

FIG. 5 is a conceptual diagram of an electron trap causing RTS noise to a transistor. FIGS. 6A to 6D are diagrams illustrating a signal waveform of RTS noise and an example of an RTS model. Hereinafter, in describing embodiments, a device to which RTS noise is applied is assumed to be a transistor.

As illustrated in FIG. 5, in a transistor formed on a semiconductor substrate, electrons may move through a channel formed between a source and a drain, the number of electrons of the channel may be random, and the electrons of the channel may be trapped by a dielectric. Also, in an embodiment, electrons E1 to E3 trapped by the dielectric may be located at different horizontal and vertical positions $y_1$-$y_3$ in the dielectric. Also, RTS noises may show different signal waveforms depending on the number and positions of electrons trapped by the dielectric. For example, an electron (or the electron E1 which is trapped at a vertically short distance) which is trapped close to the channel in the dielectric is likely to move to the channel again, and RTS noise caused by the electron E1 may relatively have a signal width.

Figure 6A:
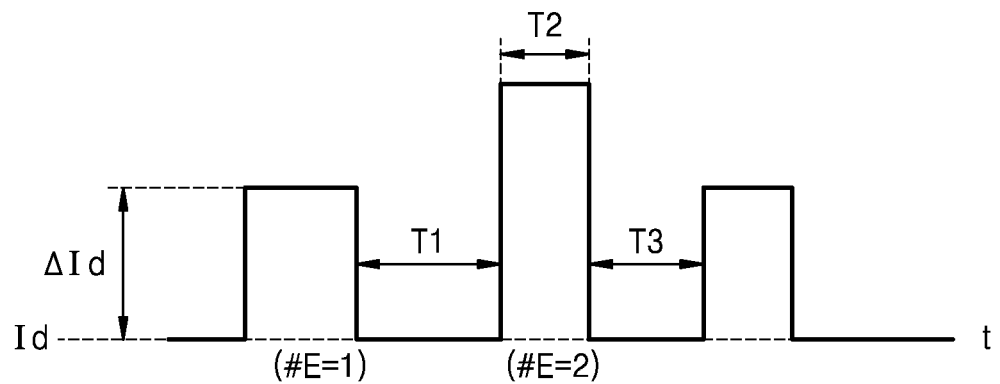
FIGS. 6A to 6D are diagrams illustrating a signal waveform of RTS noise and an example of an RTS model.

FIG. 6A is a diagram showing an example of a signal waveform of RTS noise. As shown in FIG. 6A, a current (for example, a drain current "Id") flowing through a transistor may not be constant with time and may include RTS noise having a random waveform according to electrons randomly trapped by the dielectric.

In a signal waveform of RTS noise, the RTS noise may be represented based on values of various RTS noise factors, and thus, the values of the various RTS noise factors may be calculated by analysing the signal waveform of the RTS noise. For example, in the signal waveform of the RTS noise, when a level of the signal waveform is changed at various stages, the level of the signal waveform may be relevant to the number "#E" of electrons trapped by the dielectric, a width of the signal waveform may be relevant to time constants T1 to T3, and a signal level of the RTS noise may be relevant to a difference value "Δ Id" between a level of a current (for example, a drain current) when there is no RTS noise and a level of the current when the current includes RTS noise. The time constants T1 to T3 may include a factor indicating a section where an electron is trapped and a factor indicating a section where the electron is discharged.

An RTS model corresponding to each of multiple transistors may be generated based on an arithmetic operation which is performed for the RTS noise factors, and for example, an RTS model may include various elements for changing a current which flows through each transistor. For example, the RTS model may be defined as a current source or a voltage source, or may be defined as one or more elements that are connected to at least one node of a transistor to change the characteristic (for example, a voltage and/or a current) of the transistor.

Figure 6B:
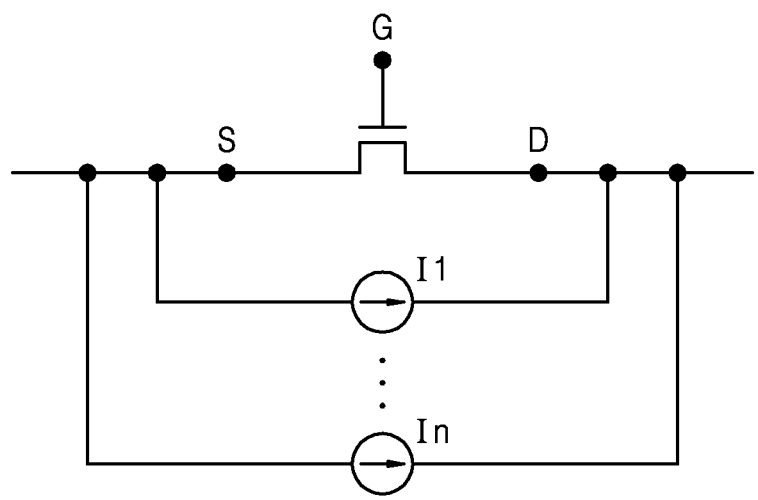

Referring to FIG. 6B, an RTS model may be defined as one or more current sources I1 to In which are connected between a source and a drain of a transistor. For example, the number of the current sources I1 to In included in the RTS model may correspond to the number of electrons trapped by a dielectric of the transistor. Also, as described above, a level of each of the current sources I1 to In may be defined as having a mean and a deviation based on values of RTS noise factors.

Figure 6C:
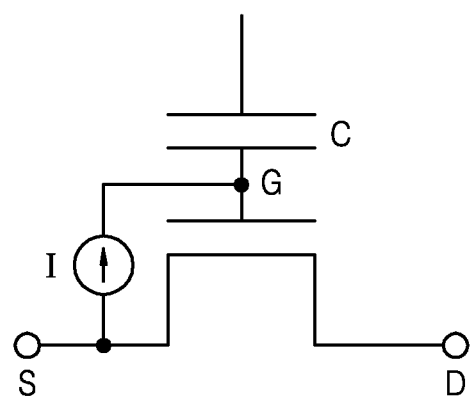

As illustrated in FIG. 6C, an RTS model may be defined as one or more current sources I which are connected between a source S and a gate G of a transistor. For example, the current source I may supply a current in a direction from the source S to the gate G, and a voltage at the gate G may be changed according to the current source I, whereby a level of a current flowing through the transistor may be changed. Also, for example, the RTS model may further include a capacitor C having one node connected to the gate G, and the voltage at the gate G may be changed by the one or more current sources I and the capacitor C. That is, an RTS model which includes the one or more current sources I and the capacitor C may be generated.

Figure 6D:
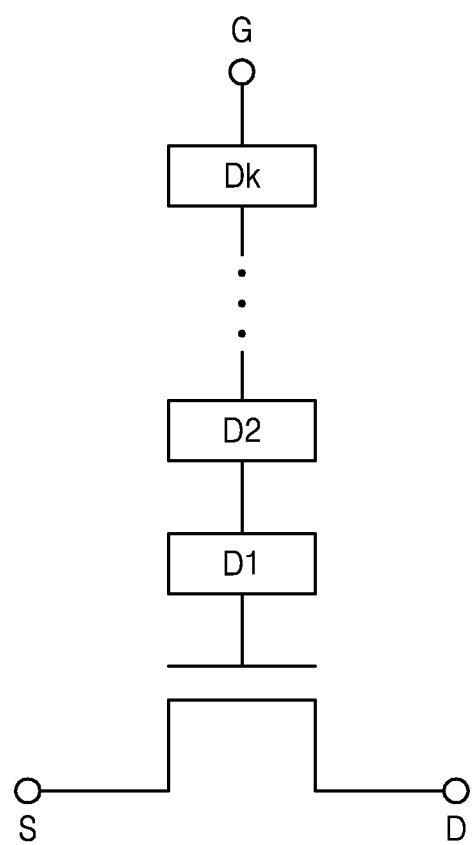

Moreover, as another example, as illustrated in FIG. 6D, an RTS model may be defined as including one or more elements D1 to Dk connected to a gate G of a transistor. For example, one or more elements illustrated in FIG. 6D may be elements causing voltage drop, and for example, the RTS model may include one or more resistors connected to the gate G of the transistor. Also, for example, the number of the elements D1 to Dk connected to the gate G of the transistor may correspond to the number of trap electrons corresponding to factors of the RTS model.

The RTS model illustrated in each of FIGS. 6A to 6D corresponds to embodiments, and in addition to the illustrated method, an RTS model may be defined according to various methods.

Figure 7:
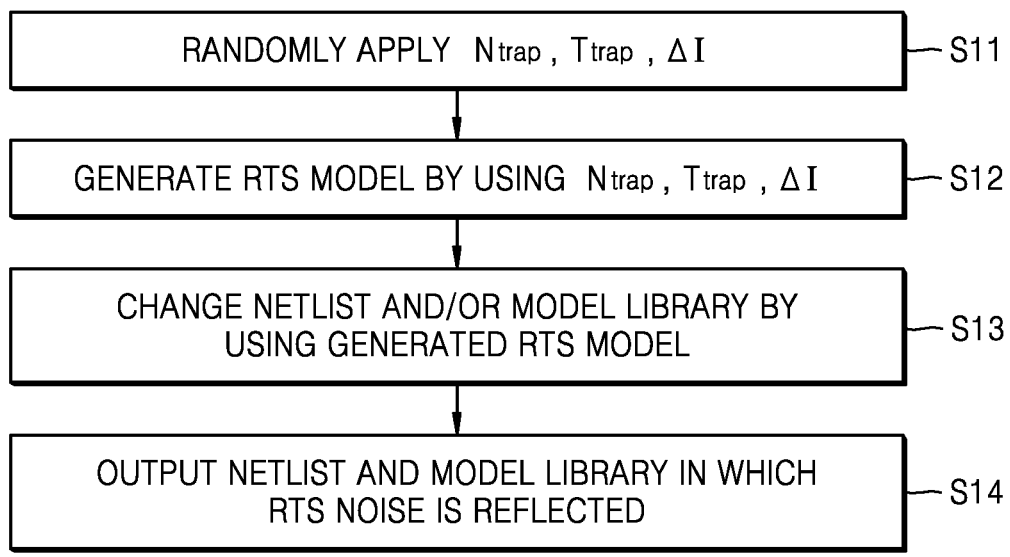
FIGS. 7 and 8 are flowcharts illustrating a simulation method according to an embodiment.
Figure 8:
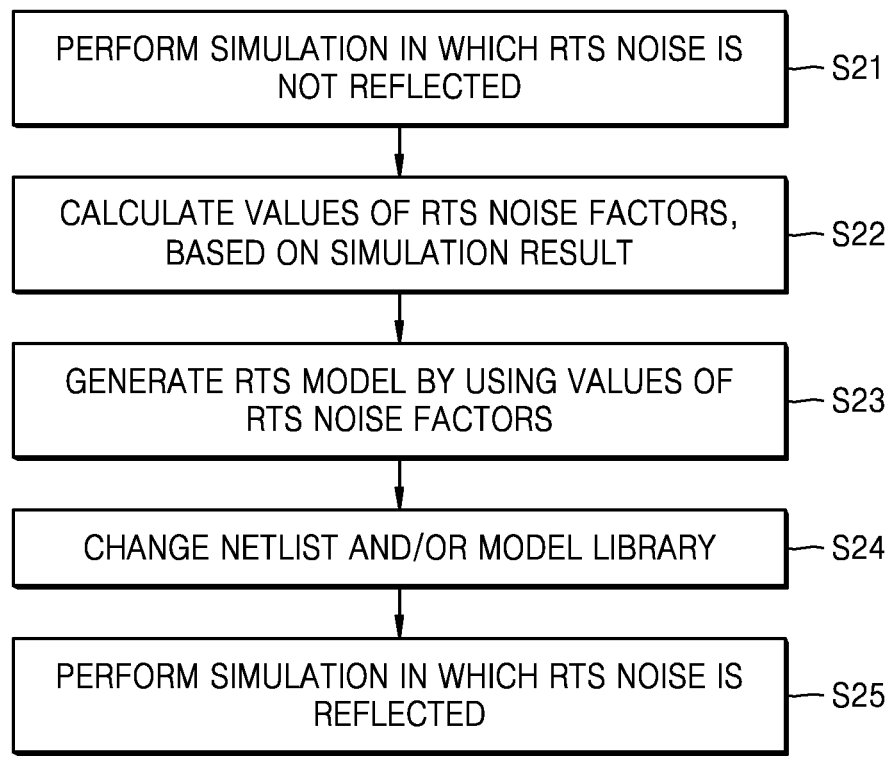

FIGS. 7 and 8 are flowcharts illustrating a simulation method according to an embodiment. The simulation method may be performed by the above-described various simulation systems illustrated in FIGS. 1 to 4.

FIG. 7 illustrates an operation example of a schematic tool (for example, a noise model application tool) that receives RTS noise information to generate a netlist and/or a model library in which RTS noise is reflected, and for example, illustrates an example where the number of trap electrons, a trap time constant, and a current difference value are used as RTS noise factors. Referring to FIG. 7, when a netlist in which RTS noise is not reflected and RTS noise information are received, a trap electron number "Ntrap", a trap time constant "Ttrap", and a current difference value "Δ I" may be randomly applied to each of multiple transistors included in the netlist in operation S11, and an RTS model corresponding to each transistor may be generated, in operation S12, by performing an arithmetic operation based on the RTS noise information applied to each transistor.

The received netlist and/or model library may be changed by using the generated RTS model in operation S13. For example, a current source corresponding to an RTS model corresponding to a transistor may be added into a netlist as an instance parameter, or a plurality of device models having parameters having different values may be newly generated in association with RTS noise for each of the transistors. Also, when the netlist and the model library are changed, a noise model application tool may output a netlist and a model library in which RTS noise is reflected in operation S14.

FIG. 8 illustrates an operation example of a schematic tool that generates a netlist in which RTS noise is reflected and calculates values of RTS noise factors. Referring to FIG. 8, a simulation may be performed by using a netlist and a model library which correspond to a circuit designed based on a user input, and thus, a simulation in which RTS noise is not reflected may be performed in operation S21. In operation S22, values of RTS noise factors of each of multiple devices may be calculated by analysing a signal waveform based on a result of the simulation, and for example, different values of RTS noise factors of the devices may be calculated depending on a structure or an operating condition of each of the devices.

Subsequently, similarly to the above-describe embodiment, an RTS model corresponding to each device may be generated by performing an arithmetic operation based on the values of the RTS noise factors in operation S23, and the netlist and/or the model library may be changed based on the generated RTS model in operation S24. A simulation in which RST noise is reflected may be performed by using a netlist and/or a model library generated through the change in operation S25.

FIG. 9 is a diagram illustrating an example of RTS noise information applied to embodiments.

As described above, values of RTS noise factors of a plurality of transistors may be calculated for generating an RTS model, and a result of the calculation may be supplied as RTS noise information to a schematic tool (or a noise model application tool) according to embodiments. A mean and a deviation of each of the RTS noise factors of each of the transistors may be supplied as the RTS noise information. Also, for example, the RTS noise factors may include the number of trap electrons, a current difference value, and a trap position of each of electrons, but according to an embodiment, factors for generating an RTS model may be set by a combination of various kinds of factors.

For example, the transistors may be classified as a plurality of types "Type 1 to Type M" according to various methods. For example, a plurality of regions included in a circuit may be classified as separate types, and thus, a plurality of devices included in the same region may be classified as the same type. Alternatively, a plurality of transistors having the same or similar structure may be classified as the same types. The RTS noise information may be calculated for each of the types of the transistors. Therefore, an RTS model may be generated by applying RTS noise factors having the same value to transistors having the same type, and an RTS model may be generated by applying RTS noise factors having different values to transistors having different types. For example, an RTS model may be generated for each of the transistors having a first type "Type 1" by using the same values of RTS noise factors, and thus, the same RTS model may be defined for each of the transistors having the first type "Type 1".

A netlist and a model library, in which RTS noise is not reflected, may include information associated with a structure (for example, a width and a length of a channel) of each of the devices and information associated with an operating condition (for example, a gate-source voltage and/or the like) of each device. Also, as illustrated in FIG. 9, the RTS noise information may include pieces of information about each of the devices which may be implemented in various types. In generating an RTS model corresponding to each of the devices, RTS noise information corresponding to each device may be selected from among pieces of RTS noise information, based on a structure and/or an operating condition of each device. That is, the RTS model corresponding to each device may be generated by using the RTS noise information selected based on the structure and/or operating condition of each device.

Figure 10:
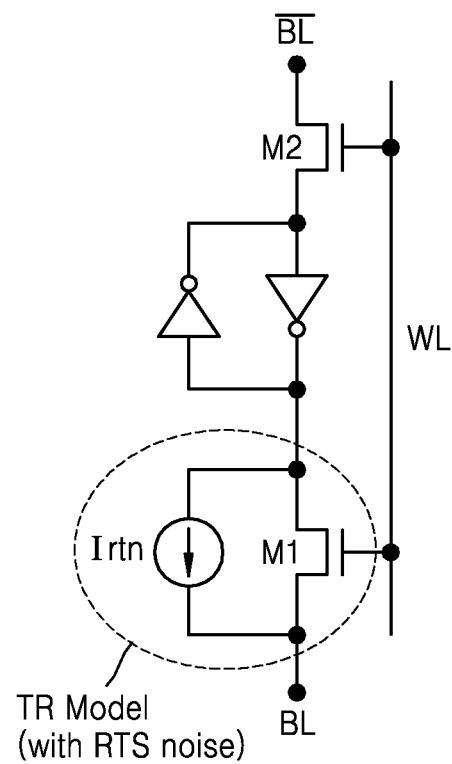
FIG. 10 is a circuit diagram illustrating an equivalent model of a circuit included in a netlist in which RTS noise is reflected.

FIG. 10 is a circuit diagram illustrating an equivalent model of a circuit included in a netlist in which RTS noise is reflected. In FIG. 10, a static random access memory (SRAM) is illustrated as an example of a simulation target circuit.

As illustrated in FIG. 10, the SRAM may include a latch for storing data and a plurality of transistors for supplying the data to the latch or outputting the data from the latch. For example, the SRAM may include first and second transistors M1 and M2 which are connected between a word line WL and a bit line BL. The first and second transistors M1 and M2 included in the SRAM may have different RTS noise characteristics. In FIG. 10, an example where RTS noise occurs in the first transistor M1 is illustrated.

Values of RTS noise factors corresponding to the first transistor M1 may be calculated by performing a simulation based on a netlist (for example, a netlist where RTS noise is not reflected) including the first transistor M1 and/or a measurement operation associated with a transistor having a structure corresponding to the first transistor M1. A netlist including the SRAM, a model library and the values of the RTS noise factors may be supplied to a schematic tool according to embodiments. The schematic tool may perform an arithmetic operation by using the values of the RTS noise factors corresponding to the first transistor M1, and as a result of the arithmetic operation, an RTS model (for example, a current source Irtn) corresponding to RTS noise which occurs in the first transistor M1 may be generated. For example, when a netlist is changed by reflecting the RTS model, the current source Irtn which is connected between a source and a drain of the first transistor M1 may be added into, as an instance parameter, a netlist generated through the change. Alternatively, when a device model in which the RTS model is reflected is generated, the first transistor M1 may correspond to a transistor model which includes the current source Irtn as a parameter.

Figure 11:
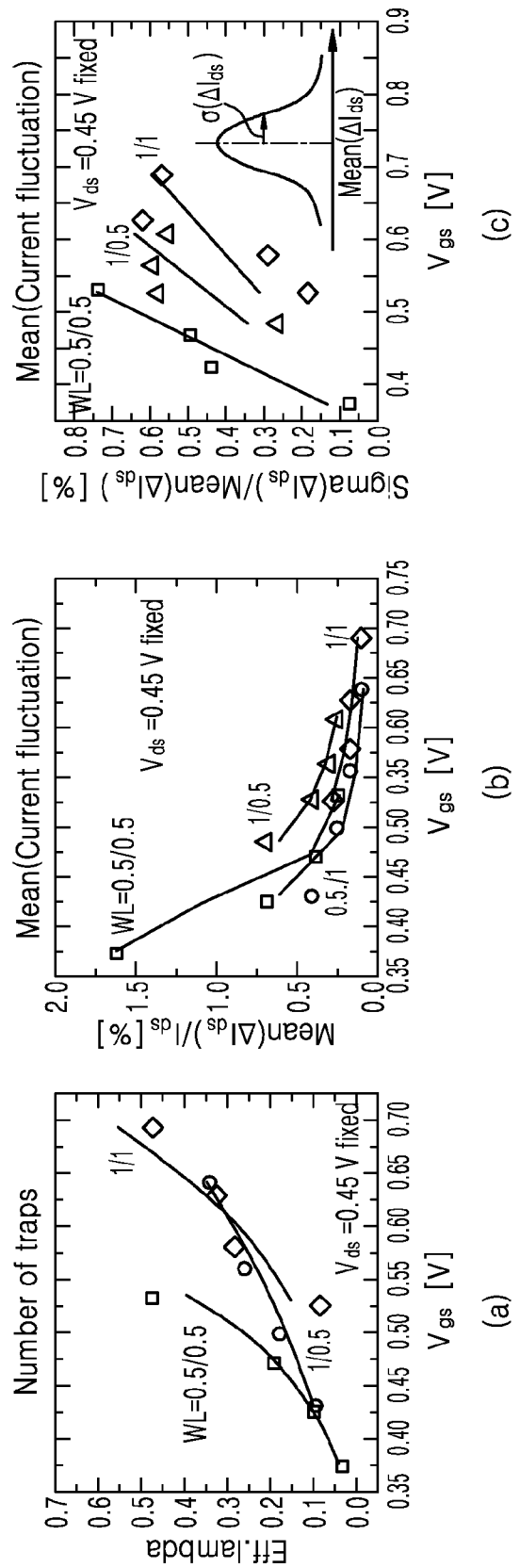
FIG. 11 is a graph showing an electron trap characteristic based on a structure of a transistor and a signal characteristic of RTS noise caused thereby.

FIG. 11 is a graph showing an electron trap characteristic based on a structure of a transistor and a signal characteristic of RTS noise caused thereby.

Referring to FIG. 11A, a structure of a transistor which affects the characteristic of RTS noise may be based on a length "L" and a width "W" size of a channel of the transistor. Also, a gate-source voltage "Vgs" of the transistor may be considered as an example of an operating condition of the transistor which affects the characteristic of the RTS noise. In FIG. 11, it is assumed that a drain-source voltage "Vds" has a fixed level in the operating condition of the transistor. For example, the ordinate axis indicates a generation probability of a trap electron based on the structure and operating condition of the transistor, and as shown in the graph, a transistor having a high gate-source voltage "Vgs" has a probability that the number of trap electrons is large. Also, as a size of a width "W" of a channel of a transistor increases, there is a characteristic where the number of trapped electrons is reduced, and as a length "L" of a channel of a transistor increases, there is a characteristic where the number of trapped electrons increases.

Referring to FIGS. 11B and 11C, a probability that an electron is trapped may be changed depending on a length "L" and a width "W" size of a channel of a transistor and a gate-source voltage "Vgs" of the transistor, and thus, a mean and a deviation of a current signal caused by RTS noise which occurs in each of transistors may be changed. For example, in a current (for example, a drain current "Id") flowing through a transistor, a ratio of a level (for example, a mean level) of a current caused by RTS noise may be changed depending on a probability that an electron is trapped, and moreover, a variation of the level of the current caused by the RTS noise may be changed.

Values of RTS noise factors used for an embodiment may be calculated by using various simulation results or measurement results based on characteristics such as a structure and the like of a transistor shown in FIG. 11, and as described above, the values of the RTS noise factors may be previously generated and may be stored in a schematic tool. Alternatively, the values of the RTS noise factors may be calculated by performing a simulation based on a netlist and a model library in which RTS noise is not reflected, and thus may be used to generate a modified netlist and/or a changed model library in which the RTS noise is reflected.

Figure 12:
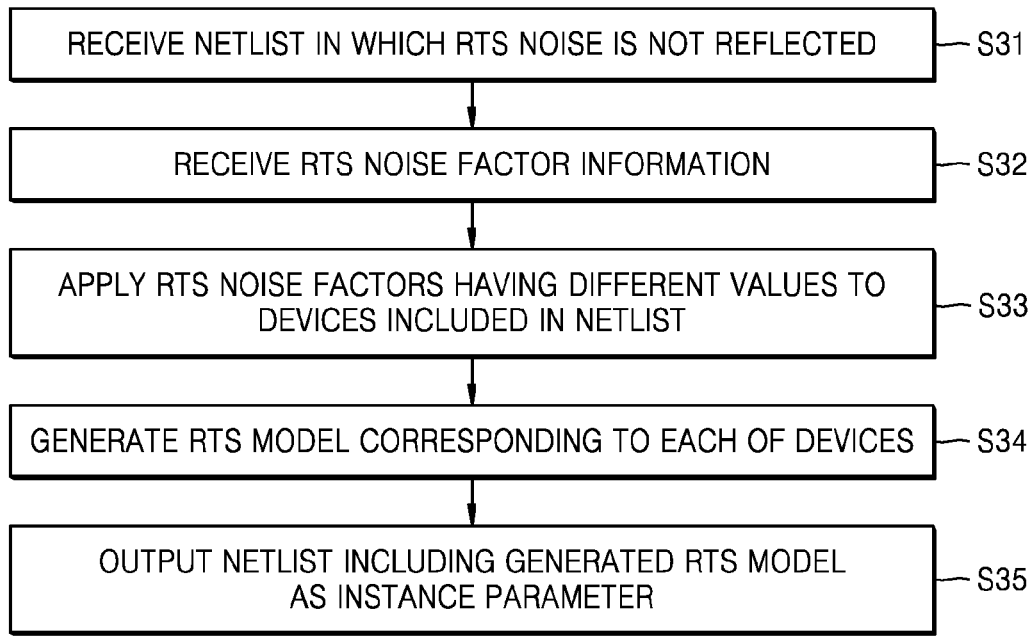
FIG. 12 is a flowchart illustrating a simulation method according to an embodiment.

FIG. 12 is a flowchart illustrating a simulation method according to an embodiment. In FIG. 12, an example where a netlist is changed for performing a simulation in which RTS noise is reflected is illustrated. For example, FIG. 12 illustrates a method of operating an RTS noise application tool that generates a netlist and/or a model library in which RTS noise is reflected.

Referring to FIG. 12, a netlist in which RTS noise is not reflected may be received in operation S31, and RTS noise factor information of each of the devices included in the netlist may be received in operation S32. Also, as described above, RTS noise factors having different values may be applied to the devices included in the netlist in operation S33, and an RTS model corresponding to a current source or a voltage source may be generated for each device included in the netlist by performing an arithmetic operation based on the RTS noise factor information in operation S34.

The RTS noise application tool may reflect the generated RTS model in the netlist and may change and output the netlist according to a result of the reflection. For example, the RTS noise application tool may output a netlist, including the generated RTS model, as an instance parameter in operation S35.

Figure 13:
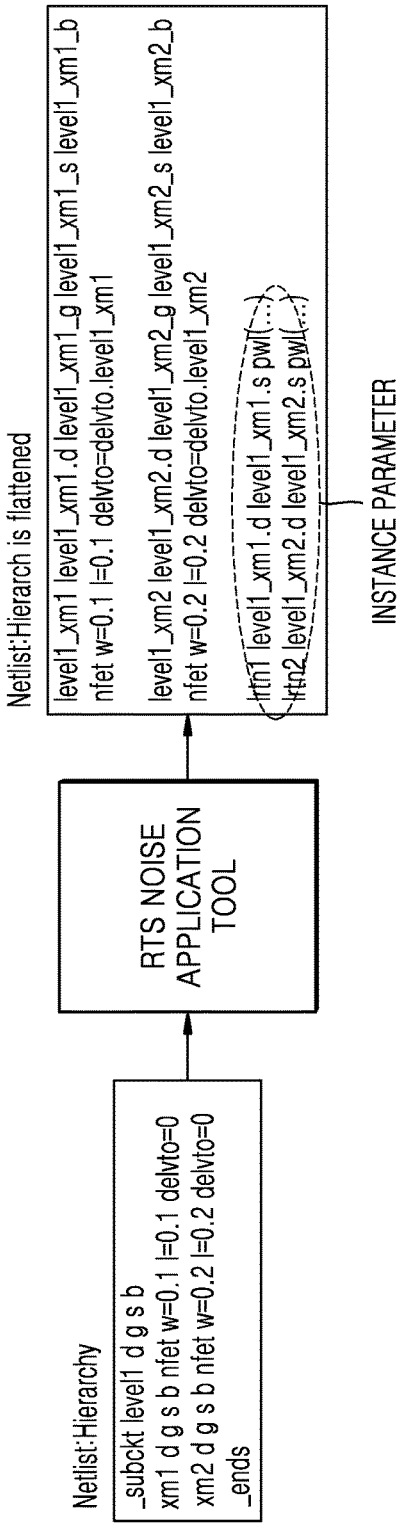
FIG. 13 is a diagram illustrating an example of input/output information of an RTS noise application tool according to embodiments.

FIG. 13 is a diagram illustrating an example of input/output information of an RTS noise application tool according to embodiments. In FIG. 13, a netlist to which RTS noise input to the RTS noise application tool according to an embodiment is not applied and a netlist to which RTS noise output from the RTS noise application tool is applied are illustrated as an example.

As illustrated in FIG. 13, the netlist input to the RTS noise application tool may have a certain hierarchical structure, but a structure of the netlist output from the RTS noise application tool may be changed from a hierarchical state to a flattened state. Also, in the netlist output from the RTS noise application tool, instance parameters may be respectively added into devices xm1 and xm2 included in a certain lower structure "level 1". For example, information about an RTS model which is generated based on a first device xm1 and a second device xm2 may be added into, as an instance parameter, a netlist generated through the change.

Figure 14A:
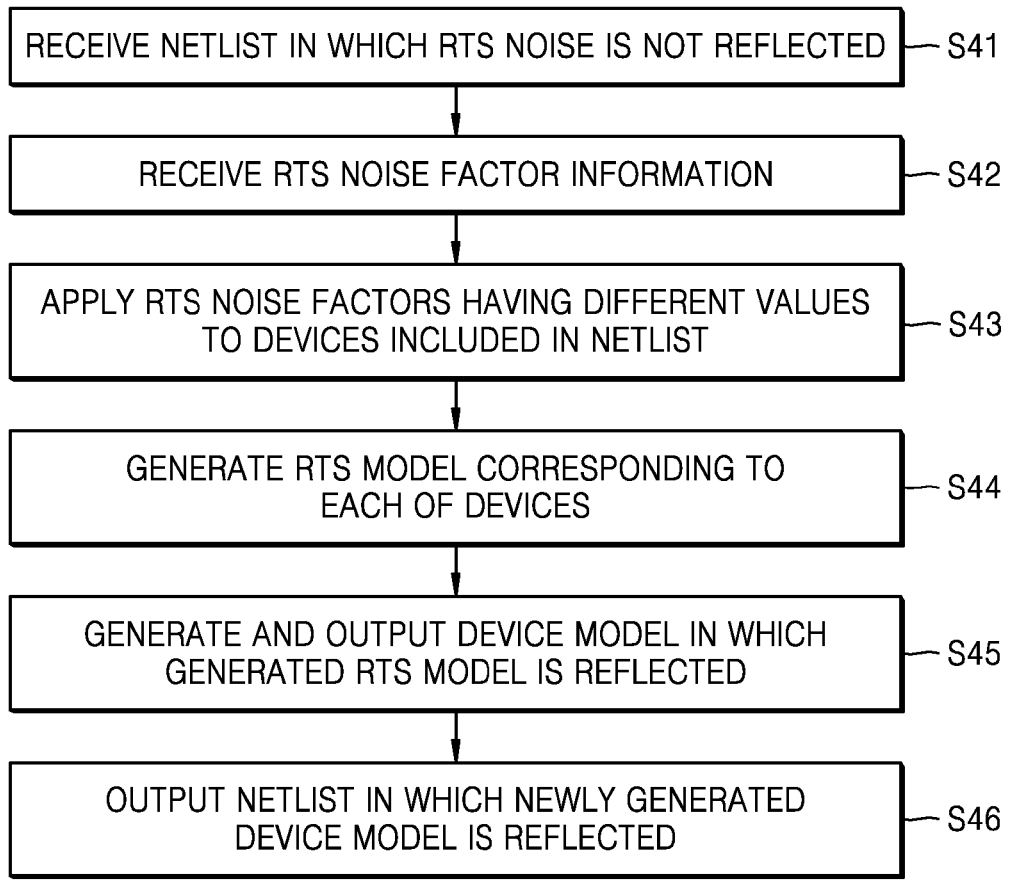
FIGS. 14A and 14B are flowcharts illustrating a simulation method according to another embodiment.
Figure 14B:
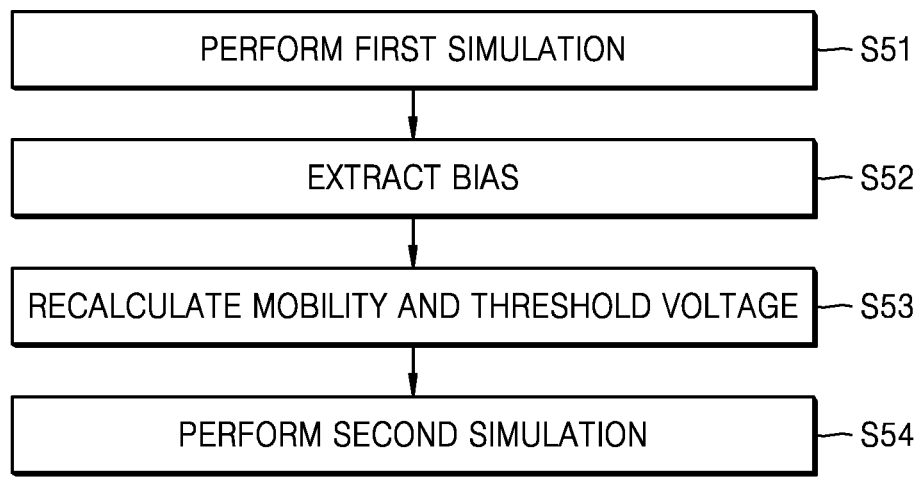

FIGS. 14A and 14B are flowcharts illustrating a simulation method according to another embodiment.

Referring to FIG. 14A, a netlist in which RTS noise is not reflected may be received in operation S41, and RTS noise factor information of each of devices included in the netlist may be received in operation S42. Also, one or more RTS noise factors having different values may be applied to the devices included in the netlist in operation S43, and an RTS model of each device may be generated by performing an arithmetic operation based on the RTS noise factor information in operation S44.

The RTS noise application tool may reflect the generated RTS model in the netlist and a model library. For example, the RTS noise application tool may generate and output a plurality of new device models, in which the generated RTS model is reflected, corresponding to devices having different RTS models in operation S45. The new device models may include parameters having different values associated with RTS noise. Also, the RTS noise application tool may output a netlist in which the new device models are reflected in operation S46, and for example, a plurality of devices included in a modified netlist may respectively correspond to the newly generated plurality of device models.

FIG. 14B is a flowchart illustrating another example of reflecting RTS noise in a model library. Referring to FIG. 14B, a first simulation may be performed in operation S51, and a bias associated with each of devices may be extracted according to the first simulation in operation S52. The first simulation may be performed identically or similarly to the above-described embodiment, and for example, a bias applied to each device may be extracted by performing a simulation based on a netlist in which the RTS noise is not reflected.

In operation S53, various parameters such as mobility and/or a threshold voltage corresponding to each device may be recalculated based on a result of the first simulation and a result of the bias extraction. Each of the recalculated parameters may correspond to a parameter for changing a level of a current (for example, a drain current) flowing through a transistor. The recalculated parameters may have values which differ from those of parameters included in original device models, and for example, device models having recalculated different parameters may be generated for each device. Also, in each of the device models, values of the recalculated parameters may be changed with time. In operation S54, a second simulation may be performed by using a device model which may be generated as described above. The second simulation may correspond to a simulation in which RTS noise according to the above-described embodiments is reflected.

Figure 15:
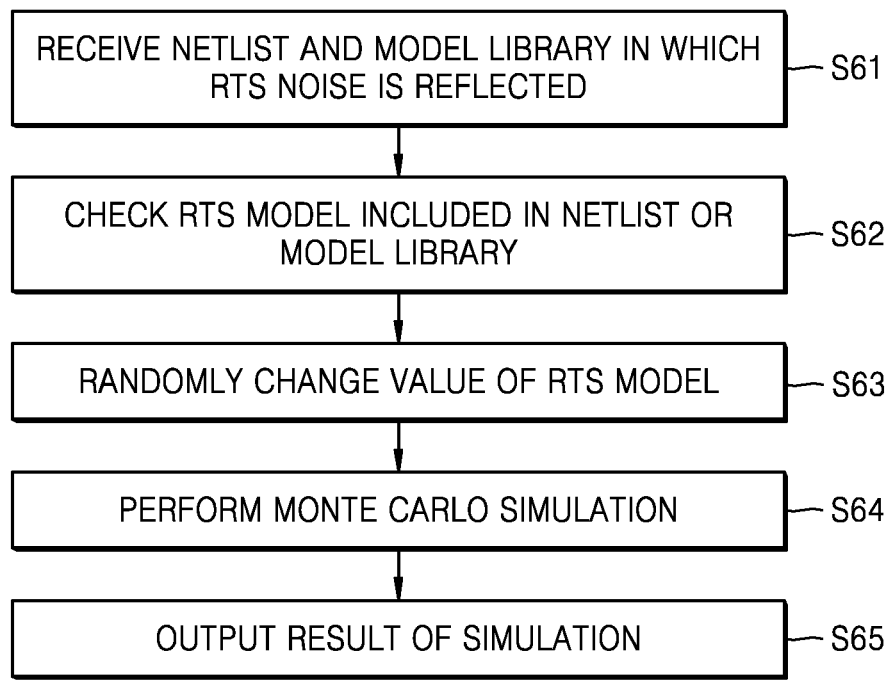
FIG. 15 is a flowchart illustrating a simulation method according to another embodiment.

FIG. 15 is a flowchart illustrating a simulation method according to another embodiment. FIG. 15 illustrates an example where a Monte Carlo simulation obtains a circuit response while randomly changing a certain value of a device.

According to embodiments, an RTS model may be defined based on values of RTS noise factors which are calculated for each of the devices, and a simulation tool may receive a netlist and a model library in which the RTS model is reflected in operation S61. The netlist or the model library in which the RTS model is reflected may include information associated with the RTS model corresponding to each device, and for example, the information associated with the RTS model may include a mean and a deviation of a current level of a current source for representing RTS noise.

In order to perform a simulation in which the RTS model is reflected, the simulation tool may check the RTS model included in the netlist or the model library in operation S62, and may randomly change a value of the RTS model, based on a mean and a deviation of a value (for example, a current level) defined in the RTS model in operation S63. A Monte Carlo simulation in which a value of the RTS model, obtained through the random change, is reflected may be performed in operation S64, and a result of the simulation may be output in operation S65.

A circuit simulation according to embodiments may provide a simulation result similar to an operation of an actual circuit for semiconductor devices (for example, SRAM, CIS, or the like) which are sensitive to noise or are important in a timing characteristic of a signal. Therefore, RTS a noise characteristic of each device may be determined at a circuit design stage, and thus, a design may be corrected, thereby reducing the development cost of a circuit.

Figure 16:
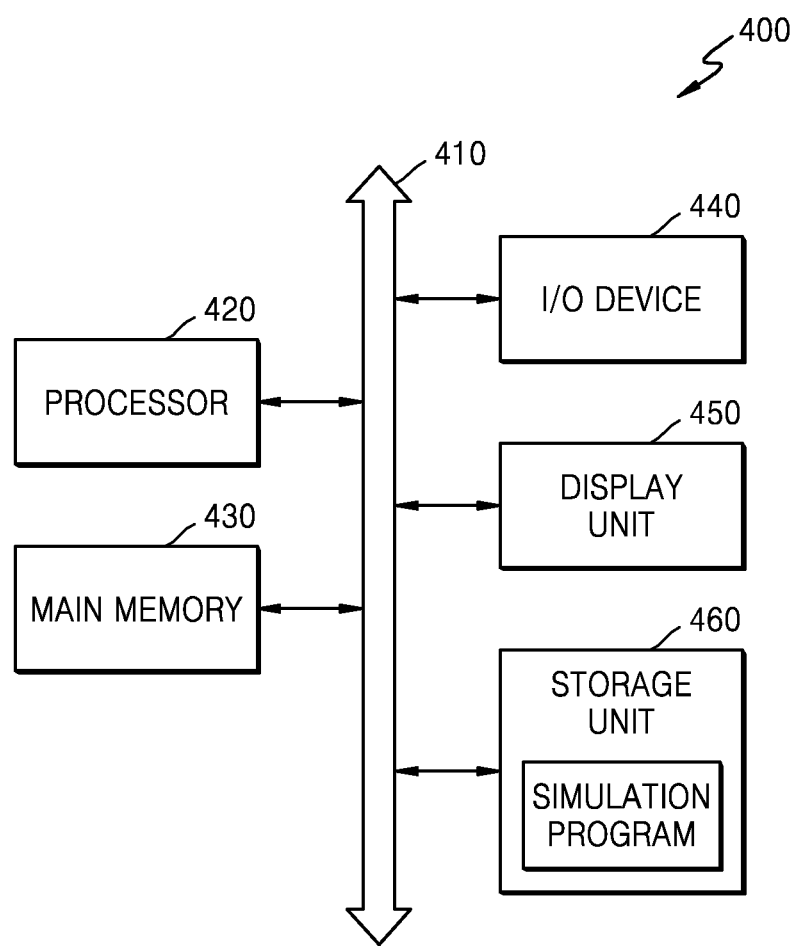
FIG. 16 is a block diagram illustrating a computing system for performing a simulation method according to an embodiment.

FIG. 16 is a block diagram illustrating a computing system 400 for performing a simulation method according to an embodiment. Referring to FIG. 16, the computing system 400 may include a system bus 410, a processor 420, a main memory 430, an input/output (I/O) device 440, a display unit 450, and a storage unit 460. The processor 420 may be configured with a single core or a multi-core. The I/O device 440 may include a keyboard, a mouse, a printer, and/or the like. The main memory 430 may be a volatile memory such as dynamic random access memory (DRAM), SRAM, or the like. The display unit 450 may include a display device such as a liquid crystal display (LCD), a light-emitting diode (LED) display, an organic light-emitting display (OLED) display, or the like. The storage unit 460 may include a nonvolatile memory such as hard disc driver (HDD), solid state drive (SSD), or the like.

The storage unit 460 may store program codes (for example, computer-readable program codes) for performing the simulation method according to the above-described embodiments. The program codes may be loaded into the main memory 430 and may be executed by the processor 420, and a simulation result which is a result of the execution may be output to the I/O device 440 or the display unit 450. According to an embodiment, the storage unit 460 may store arithmetic operation information for generating an RTS model by using input RTS noise factor information, and moreover, the program codes may include codes for generating a netlist and/or a model library in which RTS noise is reflected.

As described above, in the circuit design method and the simulation method based on RTS noise according to the embodiments, a simulation where RTS noise is reflected in devices included in an IC may be performed, and thus, the characteristic of a circuit is more accurately verified.

Figure 17:
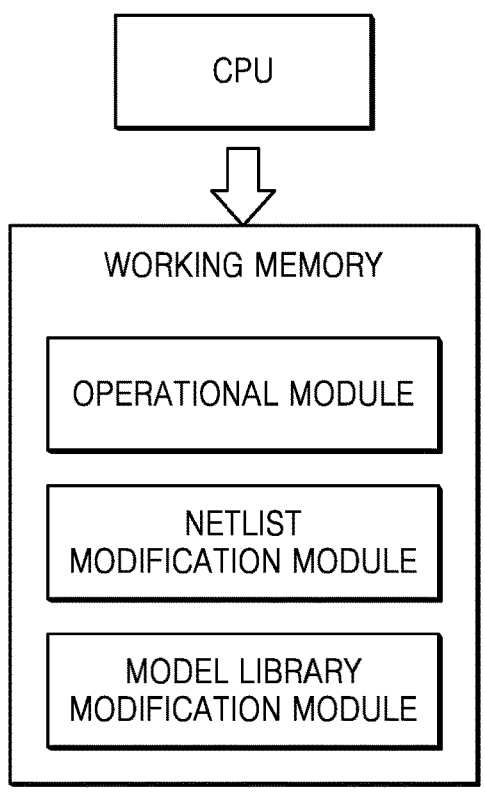
FIG. 17 is a block diagram illustrating an example where a function according to embodiments is implemented in software.

FIG. 17 is a block diagram illustrating an example where a function according to embodiments is implemented in software.

Referring to FIG. 17, a central processing unit (CPU) may execute programs stored in a working memory. The programs may include an operational module, a netlist modification module, and a model library modification module depending on functions thereof. A netlist and/or a model library in which RTS noise is reflected, according to the above-described embodiments, may be performed by executing the programs.

For example, an arithmetic operation based on values of RTS noise factors may be performed by executing the operational module, and an RTS model may be generated based on a result of the arithmetic operation. For example, a mean value and a deviation value of the RTS model corresponding to each of devices may be calculated by executing the operational module.

Moreover, by executing the netlist modification module, a netlist may be modified in order for a result of the calculation for the RTS model to be reflected therein. Also, device models in which the calculation result for the RTS model is reflected may be generated by executing the model library modification module. That is, as a result obtained by executing the programs stored in the working memory, a netlist and/or a model library in which RTS noise is reflected may be generated for each of devices.

In an embodiment illustrated in FIG. 17, the CPU and the working memory may configure a noise model application tool, or a storage medium storing a CPU-readable program may configure the noise model application tool.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to embodiments thereof, it will be understood that various changes in form and details may be made therein without departing from the spirit and scope of the following claims.

What is claimed is:

1. A simulation method, executed by a computer, comprising:
receiving, from a memory device, a first netlist describing a plurality of transistors and values of random telegraph signal (RTS) noise factors respectively corresponding to the transistors;
performing an arithmetic operation by using the values of the RTS noise factors;
generating an RTS model corresponding to each of the transistors, based on a result of the arithmetic operation, wherein the RTS model comprises a current source connected electrically in series between a source and a drain of each of the transistors;
generating a second netlist describing the transistors in which the RTS model is reflected; and
simulating an operation of the transistors using the second netlist to determine whether the simulated operation of the transistors comports with predetermined operational characteristics.

2. The simulation method of claim 1, further comprising:
receiving a first device model library corresponding to the first netlist; and
generating a second device model library in which the RTS model is reflected.

3. The simulation method of claim 2, wherein:
the generating of the second device model library comprises generating a plurality of transistor models respectively corresponding to the transistors, each of the transistor models including a parameter associated with the RTS model, and
a first plurality of the transistors included in the second netlist in which the RTS model is reflected correspond to the transistor models, respectively.

4. The simulation method of claim 1, further comprising:
receiving a device model library corresponding to the first netlist; and
outputting, to a simulation tool, the device model library and the second netlist in which the RTS model is reflected.

5. The simulation method of claim 1, wherein the second netlist in which the RTS model is reflected comprises information associated with the current source of each of the transistors as an instance parameter.

6. The simulation method of claim 1, wherein the RTS noise factors corresponding to each of the transistors comprise at least one of a trap electron number, a trap time constant, an electron trap position, and a current difference value of the transistor.

7. The simulation method of claim 1, further comprising:
receiving the values of the RTS noise factors calculated based on a result which is obtained by simulating the first netlist in which RTS noise is not reflected, wherein the RTS model is generated by performing the arithmetic operation based on the values of the RTS noise factors.

8. The simulation method of claim 1, wherein the values of the RTS noise factors are calculated by measuring operations of circuits corresponding to structures of the transistors and are pre-stored in a tool performing the simulation method.

9. The simulation method of claim 1, wherein the RTS model corresponding to each of the transistors comprises a mean and a deviation of a current level of the current source corresponding to the transistor.

10. The simulation method of claim 9, wherein simulating the operation of the transistors comprises performing a Monte Carlo simulation while randomly changing a current level of the RTS model within a range of the deviation.

11. The simulation method of claim 1, wherein the RTS noise factors corresponding to each of the transistors comprise a current difference value of the transistor.

12. A circuit design method, executed by a computer, comprising:
receiving, from a memory device, a first netlist and a first device model library in which random telegraph signal (RTS) noise is not reflected;
determining RTS noise information corresponding to each of a plurality of transistors included in the first netlist;
generating an RTS model corresponding to each of the transistors, based on a result of the determination of the RTS noise information, wherein the RTS model comprises a current source connected electrically in series between a source and a drain of each of the transistors;
outputting a second netlist and a second device model library in which the RTS noise is reflected, based on the RTS model; and
simulating an operation of the transistors using the second netlist to determine whether the simulated operation of the transistors comports with predetermined operational characteristics.

13. The circuit design method of claim 12, wherein:
the first netlist in which the RTS noise is not reflected comprises a hierarchical structure where the transistors are represented by one device model, and
the second netlist in which the RTS noise is reflected comprises a flattened structure in which different instance parameters are applied to the plurality of transistors.

14. The circuit design method of claim 13, wherein the second netlist in which the RTS noise is reflected comprises, as the instance parameters, information associated with a plurality of RTS models generated for the transistors.

15. The circuit design method of claim 12, further comprising:
receiving the RTS noise information, wherein
the RTS noise information comprises values of a plurality of RTS noise factors representing a waveform of an RTS noise signal which occurs in each of the transistors.

16. The circuit design method of claim 15, wherein the values of the RTS noise factors differ based on at least one of a structure and an operating condition of each of the transistors.

17. The circuit design method of claim 16, wherein:
the first netlist and the first device model library each comprise information indicating at least one of the structure and operation of each of the transistors, and
the values of the RTS noise factors correspond to at least one of the structure and operation of each of the transistors.

18. The circuit design method of claim 12, wherein the RTS model corresponding to each of the transistors comprises a mean and a deviation of a current level of the current source corresponding to the transistor.

19. A simulation method, executed by a computer, comprising:
receiving a first netlist describing a plurality of transistors;
performing, by using the first netlist, a first simulation in which random telegraph signal (RTS) noise is not reflected;
generating RTS noise information corresponding to each of the transistors, based on a result of the first simulation;
generating an RTS model corresponding to each of the transistors, based on the RTS noise information, wherein the RTS model comprises a current source connected electrically in series between a source and a drain of each of the transistors; and
performing, by using a second netlist describing the transistors, a second simulation in which RTS noise is reflected to determine whether a simulated operation of the transistors comports with predetermined operational characteristics, based on a result of the generation of the RTS model.

20. The simulation method of claim 19, wherein the RTS noise information comprises values of a plurality of RTS noise factors representing a waveform of an RTS noise signal which occurs in each of the transistors.

* * * * *